2,824,095

METAL-CONTAINING AZO DYESTUFFS

Reinhard Neier, Basel, and Charles Petitjean and Walter Wehrli, Riehen, Switzerland, assignors, by mesne assignments, to Saul & Co., Newark, N. J., as nominee of Fidelity Union Trust Company, executive trustee under Sandoz Trust No Drawing. Application January 18, 1954
Serial No. 404,811

Claims priority, application Switzerland
September 4, 1951

6 Claims. (Cl. 260—148)

The present application is a continuation-in-part of the copending application Serial No. 304,012, filed August 12, 1952, now Patent No. 2,779,758, and relates to new metal-containing azo dyestuffs.

A primary object of the invention is the embodiment of metal-containing azo dyestuffs of especial utility in the dyeing of wool, silk, leather and artificial nitrogen-containing fibers such as synthetic polyamide fibers (e. g. nylon, Perlon, etc.), from neutral to weakly acid dyebaths. This object is realized by the dyestuffs according to the invention which correspond in their metal-free state to the formula

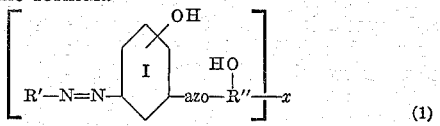

(1)

wherein the nucleus I may bear further substituents, e. g. alkyl groups, R' stands for the radical of a diazo component of the benzene or naphthalene series,

stands for the radical of a coupling component of the hydroxybenzene, hydroxynaphthalene, 5-pyrazolone, acetoacetylaminoalkane, acetoacetylaminobenzene or acetoacetylaminonaphthalene series, x stands for at least one water-solubilizing group, e. g. sulfonic acid, carboxylic acid, acylamino, alkylsulfonyl and sulfonamide groups, and wherein both OH groups stand in ortho-positions to —azo— and are linked in complex union with a chromium atom when x denotes at least one group selected from carboxylic acid, acylamino, alkylsulfonyl and sulfonamide groups, and with a cobalt atom when x denotes at least one group selected from sulfonic acid, carboxylic acid, acylamino, alkylsulfonyl and sulfonamide groups.

A preferred series of the metal-containing azo dyestuffs in accordance with the invention possess the formula

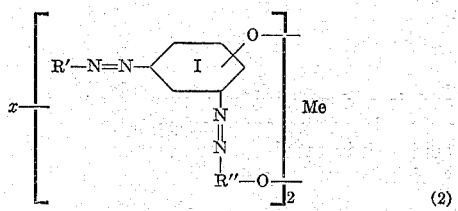

(2)

wherein R', x and I have the above mentioned significances, R"—O— stands for the radical of a coupling component of the hydroxybenzene, hydroxynaphthalene, 5-pyrazolone, acetoacetylaminoalkane, acetoacetylaminobenzene or acetoacetylaminonaphthalene series, and Me stands—when x denotes at least one group selected from carboxylic acid, acylamino, alkylsulfonyl and sulfonamide groups—for a chromium atom, and—when x denotes at least one group selected from sulfonic acid, carboxylic acid, acylamino, alkylsulfonyl and sulfonamide groups—for a cobalt atom.

The new dyestuffs are prepared by treating disazo compounds as obtained inter alia according to the process of the copending application Serial No. 304,012 and which correspond to the Formula 1, with chromium-yielding agents when x denotes at least one group selected from carboxylic acid, acylamino, alkylsulfonyl and sulfonamide groups, and with cobalt-yielding agents when x denotes at least one group selected from sulfonic acid, carboxylic acid, acylamino, alkylsulfonyl and sulfonamide groups.

In carrying out the process a preferred method consists in using for the metallization of two molecules of disazo compound less than one atom of chromium, e. g. 0.5 to 0.7 atom, to yield for example the so-called 1:2-complex compounds wherein about one atom of metal is present for two molecules of disazo compound.

The aforesaid disazo compounds may be obtained, for example, by coupling one mol of the diazo compound of a monoazo dyestuff of the formula

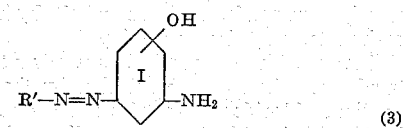

(3)

wherein R' and I have the precedingly-recited significances, with one mol of a corresponding coupling component of the formula

(4)

wherein

has the precedingly-recited significance, or by coupling one mol of the diazo compound of an amine of the benzene or naphthalene series with one mol of a monoazo dyestuff of the formula

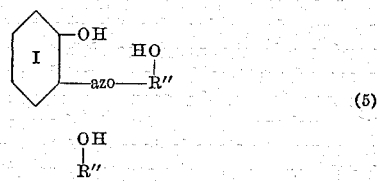

(5)

wherein $$\underset{\mathrm{R''}}{\overset{\mathrm{OH}}{|}}$$

and I have the precedingly-recited significances. The monoazo dyestuff of Formula 3 may be prepared by coupling a diazotized amine of the benzene series with a 1-hydroxy-2-N-acylaminobenzene and then converting the acylamino group of the coupling product into the NH₂ group by saponification, or by reducing the nitro group of a compound of the formula

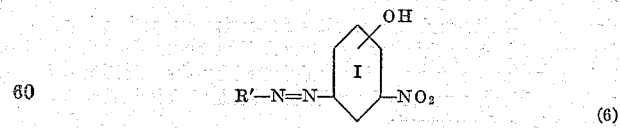

(6)

to NH₂. The disazo compounds must contain at least one water-solubilizing group selected from the precedingly-recited groups x. Compound 6—wherein R' has the precedingly-recited significance—is obtained by nitration of the corresponding hydroxy-azobenzene, obtained by coupling the appropriate amine of the benzene or naphthalene series with hydroxybenzene, or by coupling the appropriate diazotized amine of the benzene or naphthalene series with 1-hydroxy-2-nitrobenzene. Compound 5 may be obtained by coupling the diazo compound of 1-hydroxy-2-aminobenzene with a corresponding azo component which couples in ortho position to the hydroxy group.

The expression "sulfonamide groups" comprises not only the simple —$SO_2.NH_2$— group but also sulfonamide groups which are substituted by alkyl, aralkyl, cycloalkyl or aryl at the nitrogen atom. Particularly interesting representatives of these groups are the sulfonic acid methylamide, the sulfonic acid-(2'-hydroxy)-ethylamide, the sulfonic acid-(3'-methoxy)-propylamide and the sulfonic acid-(2'-carboxy)-phenylamide groups.

The conversion of the disazo compounds into the cobalt-containing or chromium-containing azo dyestuffs is advantageously carried out at elevated temperature in aqueous solution or suspension or in organic medium, e. g. in formamide, or in a molten alkali metal salt of a low molecular aliphatic monocarboxylic acid, with the aid of a cobalt- or chromium-yielding agent. These agents comprise, for example, salts of bivalent cobalt, such as cobalt sulfate, cobalt formate and cobalt acetate, and salts of trivalent chromium such as chromium fluoride, chromium sulfate, chromium acetate and potassium chromium sulfate. The alkali metal chromates and bichromates are also excellently suitable for the metallization. If the metallization is carried out in a molten alkali metal salt of a low molecular aliphatic monocarboxylic acid, insoluble metal compounds, such as cobalt hydroxide or cobalt carbonate, may also be employed.

The metallization products are advantageously precipitated from the reaction solution by the addition of salt (sodium chloride) after which they are filtered off and finally dried. They are generally dark powders which dissolve in water with yellow, orange, brown, red, violet, blue, olive to gray coloration, and dye wool, silk, nitrogenous synthetic fibers such as synthetic polyamide fibers and leather from a neutral to weakly acid bath in similar shades which are characterized by excellent fastness properties.

The following examples further illustrate the invention by means of representative embodiments thereof; however, it is not intended to restrict the invention to the said examples. In the latter, the parts are parts by weight, the percentages are percentages by weight, and the temperatures are in degrees centigrade.

In connection with the nomenclature of the monoazo compounds serving for the preparation of the starting products in the examples, it may be noted that in all cases where two benzene nuclei are linked together by the azo group, the monoazo compound is defined as a "1,1-azobenzene" compound, whereas in those cases where a benzene nucleus is connected to a naphthalene nucleus by the azo group, the monoazo compound is defined as a "benzene-azo-naphthalene" compound.

EXAMPLE 1

26.5 parts of the disazo compound, obtained by coupling diazotized 1-(3'-amino-4'-hydroxy) - benzene - azo-naphthalene-4-sulfonic acid with acetoacetylaminobenzene, are dissolved in 700 parts of water at 80°. 6.3 parts of crystalline cobaltous acetate are added to the solution at 70–75°, and the resultant reaction mass is stirred for some time at this temperature. The so-produced cobalt complex compound is precipitated by the addition of sodium chloride and is then filtered off and dried. It corresponds to the formula

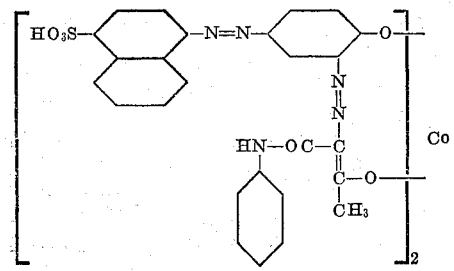

and is a brown powder which dyes wool, silk, synthetic polyamide fibers and leather from a neutral to weakly acid bath in orange shades of good fastness to light and very good fastness to washing, to fulling and to potting.

EXAMPLE 2

24.9 parts of the disazo compound, obtained by coupling diazotized 2-(3'-amino-4'-hydroxy) - benzene - azo-naphthalene-7-sulfonic acid with 2-hydroxynaphthalene, are dissolved in 1500 parts of water at 85°. After the addition of 10 parts of crystalline sodium acetate and 8 parts of crystalline cobaltous sulfate, the resultant reaction mass is stirred for several hours at 70–80°, the thus-produced cobalt complex compound is precipitated by the addition of sodium chloride, and is filtered off.

The cobalt-containing azo dyestuff corresponds to the formula

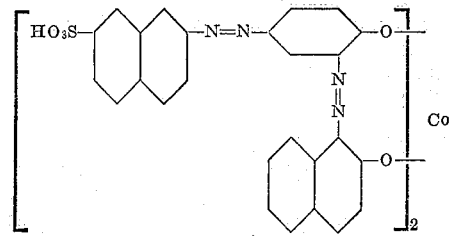

and, in the dried state, is a dark powder which dyes wool, silk, synthetic polyamide fibers and leather from a neutral to weakly acid bath in reddish brown shades of excellent fastness to light, to washing, to fulling and to potting.

EXAMPLE 3

49.8 parts of the disazo compound, obtained by coupling diazotized 1-(3'-amino-4'-hydroxy)-benzene-azo-naphthalene with 2-hydroxynaphthalene-7-sulfonic acid, are dissolved together with 4 parts of sodium hydroxide in 2000 parts of water at 80°. Into the resultant solution, at 60° and while stirring thoroughly, there is added dropwise a mixture of 14.2 parts of crystalline cobaltous sulfate, 130 parts of aqueous tartaric acid solution of 3% strength and 18.4 parts of aqueous sodium hydroxide solution of 30% strength. After stirring for a half hour, the cobalt complex compound is precipitated from the reaction mixture by the addition of sodium chloride after which it is filtered off and dried. It corresponds to the formula

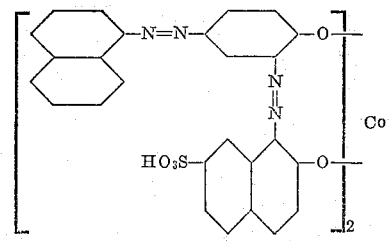

and is a dark powder which dyes wool, silk, synthetic polyamide fibers and leather from a neutral to weakly acid bath in reddish brown shades of noteworthy fastness to light, to washing, to fulling and to potting.

EXAMPLE 4

49.8 parts of the starting compound described in the preceding example are dissolved together with 4 parts of sodium hydroxide in 2000 parts of water at 85°, the solution is rendered weakly acid by the addition of 6 parts of acetic acid, after which the solution is refluxed with 14.2 parts of crystalline cobaltous sulfate, until no metal-free dyestuff can be detected in a test specimen withdrawn from the reaction mixture. After the addition of sodium chloride to the cobaltizing solution, the resultant cobalt complex compound is filtered off and then dried. It is identical with the cobalt-containing azo dyestuff obtained according to Example 3.

EXAMPLE 5

29.5 parts of the disazo dyestuff obtained by coupling 3-amino-4-hydroxy-1,1'-azobenzene-3'-sulfonic acid-(2''-hydroxy)-ethylamide with 1-carbo-(2'-ethoxy)-ethoxy-amino-7-hydroxynaphthalene, are refluxed in aqueous solution together with 16.1 parts of the sodium salt of 1-hydroxy-benzene-2-carboxylic acid, containing 8.1% of chromium in complex combination, until the disazo compound has been converted into the chromium-containing azo dyestuff. The latter is precipitated from the reaction solution by the addition of sodium chloride, after which it is filtered off, dried and ground. It corresponds to the formula

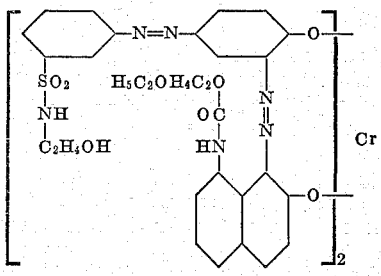

and is a dark powder which dyes wool, silk, synthetic polyamide fibers and leather from a neutral to weakly acid bath in grayish olive shades of very good fastness to light, to washing, to fulling and to potting.

EXAMPLE 6

44.7 parts of the disazo compound, obtained by coupling diazotized 3-amino-4-hydroxy-1,1'-azobenzene-3'-sulfonic acid amide with 2-hydroxynaphthalene, are heated to 125° for approximately one hour in 200 parts of formamide together with 28 parts of potassium chromium (III) sulfate, while stirring. The resultant chromium complex compound is precipitated by diluting the chroming mixture with concentrated aqueous sodium chloride solution, after which it is filtered off and dried. It corresponds to the formula

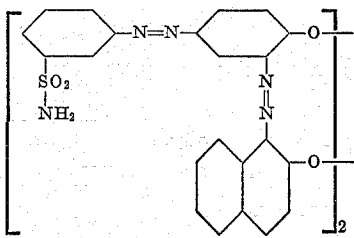

and is a dark powder which dyes wool, silk, synthetic polyamide fibers and leather from a neutral to weakly acid bath in gray-brown shades of good fastness properties.

The following table sets forth additional metal-containing azo dyestuffs according to the present invention. The cobalt complex compounds can be prepared according to one of the methods set forth in Examples 1 to 4 and the chromium complex compounds can be prepared according to one of the methods described in Examples 5 and 6. In the table, the metal-containing azo dyestuffs are characterized in column II by the metal-free disazo compounds from which they are derived, in column III by the metal which the azo dyestuffs contain in complex combination, and in column IV by the shade of the dyeings of the corresponding metal complex compounds on wool.

Table

| (I) Example No. | (II) | (III) | (IV) |
|---|---|---|---|
| 7 | 3-amino-4-hydroxy-1,1'-azobenzene-4'-sulfonic acid ⟶ acetoacetylaminobenzene. | Co | orange. |
| 8 | 1-(3'-amino-4'-hydroxy)-benzene-azonaphthalene-5-sulfonic acid ⟶ 2-hydroxynaphthalene. | Co | reddish-brown. |
| 9 | 3-amino-4-hydroxy-1,1'-azobenzene ⟶ 2-hydroxynaphthalene-4-sulfonic acid. | Co | brown. |
| 10 | 3-amino-4-hydroxy-4'-methyl-1,1'-azobenzene ⟶ 1-hydroxynaphthalene-4-sulfonic acid. | Co | red-brown. |
| 11 | 3-amino-4-hydroxy-1,1'-azobenzene-4'-sulfonic acid ⟶ 2-hydroxynaphthalene. | Co | Do. |
| 12 | 1-(3'-amino-4'-hydroxy)-benzene-azonaphthalene-4-sulfonic acid ⟶ 2-hydroxynaphthalene. | Co | Do. |
| 13 | 2-(3'-amino-4'-hydroxy)-benzene-azonaphthalene-6-sulfonic acid ⟶ 2-hydroxynaphthalene. | Co | Do. |
| 14 | 3-amino-4-hydroxy-1,1'-azobenzene ⟶ 2-hydroxynaphthalene-6-sulfonic acid. | Co | Do. |
| 15 | 1-(3'-amino-4'-hydroxy)-benzene-azonaphthalene-4-sulfonic acid ⟶ 1-acetylamino-7-hydroxynaphthalene. | Co | gray-olive. |
| 16 | 3-amino-4-hydroxy-1,1'-azobenzene-2'-carboxylic acid ⟶ 1-propionyl-amino-7-hydroxynaphthalene. | Co | Do. |
| 17 | 3-amino-4-hydroxy-1,1'-azobenzene-3'-sulfonic acid amide ⟶ 1-carbo-(2'-ethoxy)-ethoxyamino-7-hydroxynaphthalene. | Co | Do. |
| 18 | 1-(3'-amino-4'-hydroxy)-benzene-azonaphthalene-4-sulfonic acid ⟶ 1-phenyl-3-methyl-5-pyrazolone. | Co | red-brown. |
| 19 | 1-(3'-amino-4'-hydroxy)-benzene-azo-naphthalene-5-sulfonic acid ⟶ 1-(3'-chloro)-phenyl-3-methyl-5-pyrazolone. | Co | Do. |
| 20 | 1-(2'-hydroxy-3'-amino-5'-methyl)-benzene-azo-naphthalene-5-sulfonic acid ⟶ 2-hydroxynaphthalene. | Co | blue-gray. |
| 21 | 1-(2'-hydroxy-3'-amino-5'-tert.butyl)-benzene-azo-naphthalene-5-sulfonic acid ⟶ 2-hydroxynaphthalene. | Co | Do. |
| 22 | 3-amino-4-hydroxy-1,1'-azobenzene-4'-sulfonic acid amide ⟶ 1,3-dihydroxy-benzene. | Co | bordeaux. |
| 23 | 3-amino-4-hydroxy-1,1'-azobenzene-3'-sulfonic acid amide ⟶ 2-hydroxynaphthalene. | Co | red-brown. |
| 24 | 2-hydroxy-3-amino-5-methyl-1,1'-azo-benzene-3'-sulfonic acid amide ⟶ 2-hydroxynaphthalene. | Co | blue-gray. |
| 25 | 3-amino-4-hydroxy-1,1'-azobenzene-3'-sulfonic acid amide ⟶ acetoacetylaminobenzene. | Co | orange. |
| 26 | 3-amino-4-hydroxy-1,1'-azobenzene-3'-sulfonic acid-(2''-hydroxy)-ethylamide ⟶ acetoacetylaminobenzene. | Co | Do. |
| 27 | 3-amino-4-hydroxy-1,1'-azobenzene-4'-sulfonic acid-(2''-hydroxy)-ethylamide ⟶ 1-carbo-(2'-ethoxy)-ethoxyamino-7-hydroxynaphthalene. | Co | gray-olive. |
| 28 | 3-amino-4-hydroxy-1,1'-azobenzene-4'-sulfonic acid amide ⟶ 1-carbo-(2'-ethoxy)-ethoxyamino-7-hydroxynaphthalene. | Co | Do. |
| 29 | 2-(3'-amino-4'-hydroxy)-benzene-azo-naphthalene-1-sulfonic acid ⟶ 2-hydroxynaphthalene. | Co | red-brown. |
| 30 | 3-amino-4-hydroxy-4'-ethoxy-1,1'-azobenzene ⟶ 2-hydroxynaphthalene-7-sulfonic acid. | Co | Do. |
| 31 | 3-amino-4-hydroxy-4'-methoxy-1,1'-azobenzene ⟶ 1-acetoacetylaminobenzene-4-sulfonic acid. | Co | orange. |
| 32 | 3-amino-4-hydroxy-2',4'-dimethyl-1,1'-azobenzene-6'-sulfonic acid ⟶ 2-hydroxynaphthalene. | Co | red-brown. |
| 33 | 3-amino-4-hydroxy-2'-methyl-3'-chloro-1,1'-azobenzene-5'-sulfonic acid ⟶ 2-hydroxynaphthalene. | Co | Do. |
| 34 | 3-amino-4-hydroxy-2',4',6'-trimethyl-1,1'-azobenzene ⟶ 2-hydroxynaphthalene-7-sulfonic acid. | Co | Do. |
| 35 | 3-amino-4-hydroxy-4'-tert.amyl-1,1'-azobenzene ⟶ 2-hydroxynaphthalene-6-sulfonic acid. | Co | Do. |
| 36 | 3-amino-4-hydroxy-4'-nitro-1,1'-azobenzene ⟶ 2-hydroxynaphthalene-4-sulfonic acid. | Co | brown. |
| 37 | 3-amino-4-hydroxy-3'-methylsulfonyl-1,1'-azobenzene ⟶ 2-hydroxynaphthalene-4-sulfonic acid amide. | Cr | brown-gray. |

| (I) Example No. | (II) | (III) | (IV) |
|---|---|---|---|
| 38 | 3-amino-4-hydroxy-1,1'-azobenzene-3'-sulfonic acid-(2''-hydroxy)-ethylamide ⟶ 2-hydroxynaphthalene. | Cr | Brown-gray. |
| 39 | 3-amino-4-hydroxy-1,1'-azobenzene-4'-sulfonic acid amide ⟶ 1-carbo-(2'-ethoxy)-ethoxyamino-7-hydroxynaphthalene. | Cr | olive. |
| 40 | 3-amino-4-hydroxy-1,1'-azobenzene-4'-sulfonic acid amide ⟶ 1,3-dihydroxy-benzene | Cr | orange-brown. |
| 41 | 3-amino-4-hydroxy-1,1'-azobenzene-3'-sulfonic acid amide ⟶ 1-phenyl-3-methyl-5-pyrazolone. | Cr | orange. |
| 42 | 3-amino-4-hydroxy-3'-methylsulfonyl-1,1'-azobenzene ⟶ acetoacetyl-amino-benzene. | Cr | yellow-brown. |
| 43 | 2-hydroxy-3-amino-5-methyl-1,1'-azobenzene-3'-sulfonic acid amide ⟶ 2-hydroxynaphthalene. | Cr | blue-gray. |
| 44 | 2-hydroxy-3-amino-5-methyl-1,1'-azobenzene-2'-carboxylic acid ⟶ 1-acetylamino-7-hydroxynaphthalene. | Cr | greenish-gray. |
| 45 | 3-amino-4-hydroxy-1,1'-azobenzene-2'-carboxylic acid ⟶ 1-acetyl-amino-7-hydroxynaphthalene. | Cr | Do. |
| 46 | 3-amino-4-hydroxy-1,1'-azobenzene-4'-sulfonic acid-(2''-hydroxy)-ethylamide ⟶ 2-hydroxynaphthalene. | Cr | gray-brown. |
| 47 | 3-amino-4-hydroxy-1,1'-azobenzene-4'-sulfonic acid-(2''-hydroxy)-ethylamide ⟶ 1-carbo-(2'-ethoxy)-ethoxyamino-7-hydroxynaphthalene. | Cr | olive. |
| 48 | 3-amino-4-hydroxy-1,1'-azobenzene-4'-sulfonic acid amide ⟶ 1-phenyl-3-methyl-5-pyrazolone. | Cr | orange. |
| 49 | 2-hydroxy-3-amino-5-methyl-1,1'-azobenzene-4'-sulfonic acid amide ⟶ 2-hydroxynaphthalene. | Cr | blue-gray. |
| 50 | 3-amino-4-hydroxy-1,1'-azobenzene-3'-sulfonic acid amide ⟶ 1-carbo-(2'-ethoxy)-ethoxyamino-7-hydroxynaphthalene. | Cr | olive. |
| 51 | 3-amino-4-hydroxy-2'-methoxy-1,1'-azobenzene-5'-sulfonic acid amide ⟶ 1-carbo-(2'-ethoxy)-ethoxyamino-7-hydroxynaphthalene. | Cr | Do. |
| 52 | 3-amino-4-hydroxy-1,1'-azobenzene-4'-sulfonic acid ⟶ 1-acetoacetyl-aminonaphthalene. | Co | yellow-brown. |
| 53 | 3-amino-4-hydroxy-1,1'-azobenzene-4'-sulfonic acid amide ⟶ 1-aceto-acetylaminobutane. | Co | Do. |
| 54 | 1-(3'-amino-4'-hydroxy)-benzene-azonaphthalene-4-sulfonic acid ⟶ 1-acetoacetylaminooctane. | Co | Do. |
| 55 | 1-(3'-amino-4'-hydroxy)-benzene-azonaphthalene-4-sulfonic acid ⟶ 1-(5',6',7',8'-tetrahydro)-naphthyl-(2')-3-methyl-5-pyrazolone. | Cr | orange-brown. |

EXAMPLE 56

In a porcelain container of a capacity of about 2 liters, a solution is prepared which contains 0.5 part of the chromium-containing azo dyestuff according to Example 5 and 0.5 part of concentrated acetic acid in 500 parts of water at 40°. 50 parts of thoroughly pre-wetted wool are introduced into the thus-prepared dyebath. The temperature of the bath is raised to 100° in the course of 30 minutes, while repeatedly moving the material about therein, and the temperature is then maintained at 100° for one hour. At the end of this time, the dyestuff has completely been drawn onto the fiber. The dyed material is thoroughly rinsed in water and then dried. It is dyed in an olive shade of excellent fastness to light, to washing, to fulling and to potting.

Synthetic polyamide fiber and silk can be dyed in similar manner, and with these materials the dyeing process can be carried out below the boiling temperature. Similar perfect dyeings can also be obtained upon wool, employing a maximum temperature of about 90°.

Having thus disclosed the invention what is claimed is:

1. A member selected from the class consisting of metal-containing azo dyestuffs corresponding to one of the formulae

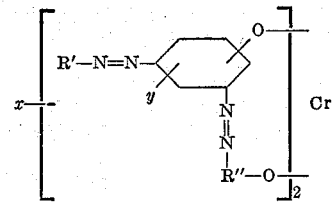

and

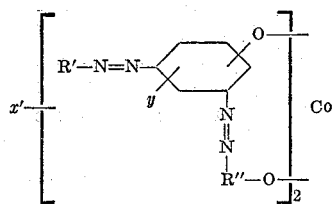

wherein R' stands for a member selected from the group consisting of the radicals of diazo components of the benzene and naphthalene series, R''—O— stands for a member selected from the group consisting of the radicals of coupling components of the hydroxybenzene, hydroxynaphthalene, 5-pyrazolone, acetoacetylaminoalkane, acetoacetylaminobenzene and acetoacetylaminonaphthalene series, $x$ stands for at least one group selected from the class consisting of the carboxylic acid, acylamino, methylsulfonyl and sulfonamide groups, $x'$ stands for at least one group selected from the class consisting of the sulfonic acid, carboxylic acid, acylamino, methylsulfonyl and sulfonamide groups, and $y$ stands for a member selected from the group consisting of hydrogen and lower alkyl, and wherein each —O— atom is in ortho-position to an —N=N—group.

2. The cobalt-containing azo dyestuff corresponding to the formula

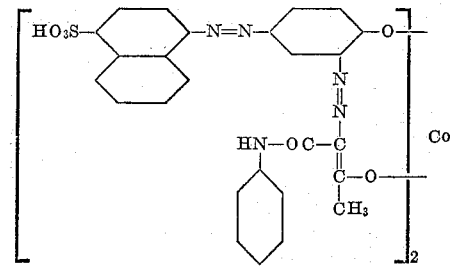

3. The cobalt-containing azo dyestuff corresponding to the formula

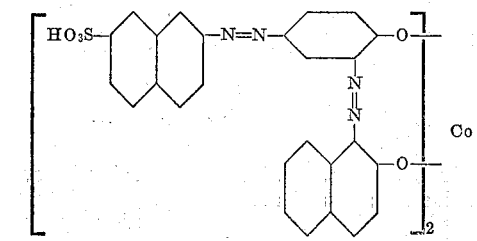

4. The cobalt-containing azo dyestuff corresponding to the formula

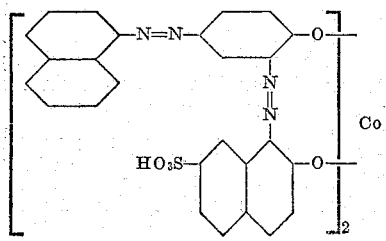

5. The chromium-containing azo dyestuff corresponding to the formula
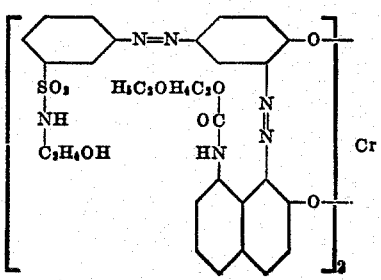
6. The chromium-containing azo dyestuff corresponding to the formula
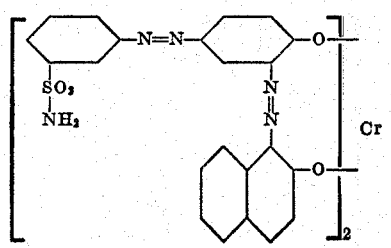
References Cited in the file of this patent
UNITED STATES PATENTS
| | | |
|---|---|---|
| 1,947,027 | Woodward | Feb. 13, 1934 |
| 2,735,844 | Neier | Feb. 21, 1956 |